H. Peeler,
Boring Gun-Barrels,
N°6,088. Patented Feb. 6, 1849.
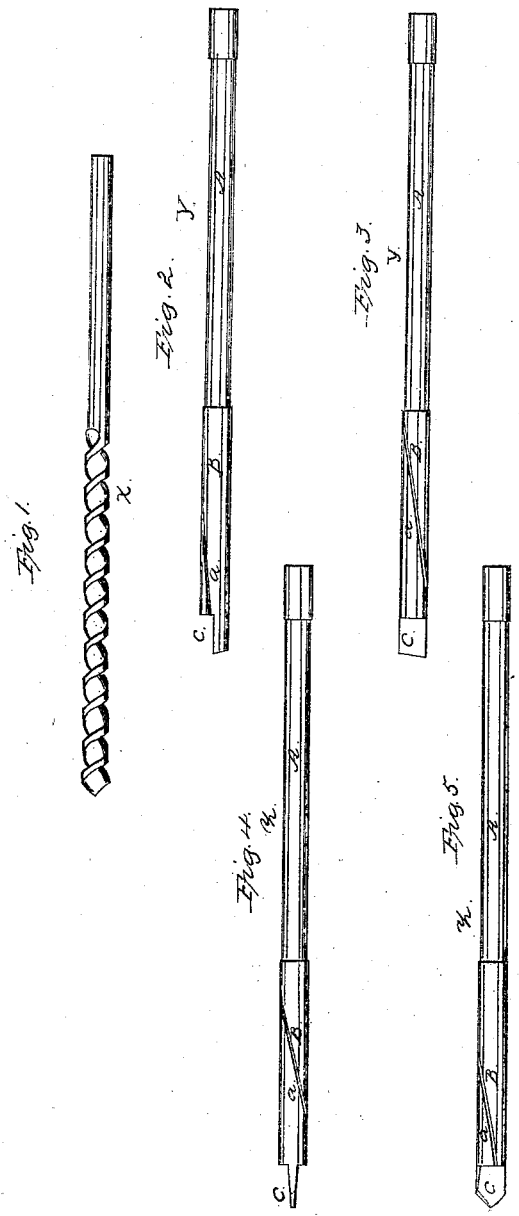

UNITED STATES PATENT OFFICE.

HENRY PEELER, OF BOSTON, MASSACHUSETTS.

IMPROVED METHOD OF BORING GUN-BARRELS.

Specification forming part of Letters Patent No. 6,088, dated February 6, 1849.

*To all whom it may concern:*

Be it known that I, HENRY PEELER, of Boston, in the county of Suffolk and State of Massachusetts, have invented a new and useful Method of Drilling or Boring Gun, Rifle, or Pistol Barrels or other Tubes of Small Caliber; and I do hereby declare that the same is fully described and represented in the following specification and accompanying drawings, letters, figures, and references thereof.

In boring gun or pistol barrels it is customary to employ a twisted drill or auger of the kind represented in Figure 1 of the accompanying drawings. The great advantage such a tool possesses over any other kind of drills consists in the facility, ease, and dispatch with which it performs its operations. It however is attended with one serious disadvantage—that is to say, it is next to an impossibility to bore a perfectly-straight hole with it, for after having entered the metal to the depth of about three or four inches it almost invariably deviates from a straight line, and in order to overcome this difficulty it becomes necessary often to bend the rod which is being bored by said drill.

My process of boring consists in using such a drill, but in connection with others, Fig. 2 being a side view of one; Fig. 3, another side view of it, but taken at right angles to that of Fig. 2. Figs. 4 and 5 are similar side views of the other drill.

Each of the last two drills consists of a cylinder A, united at one end to a shank B and having a cutting-tool C attached to its opposite end and shaped as seen in the drawings. Each of said cylinders is provided with a long air-groove $a$, which is cut in its outer surface and made to extend from one end of it to the other end of it, the same being for the purpose of suffering the air to escape when the drill is in the act of entering the hole or bore of the barrel of a gun.

For the sake of brevity in description I shall denominate the twisted or auger-drill shown in Fig. 1 as drill X, the drill shown in Figs. 2 and 3 as drill Y, and the other as drill Z. This latter drill is provided with an angular cutting-point or cutter, the vertex of which is in the axis of the drill. The angle of said cutter should be made to correspond with the angle of the cutting end of the drill X, the object of drill Z being to prepare the way for the auger-drill X—that is to say, after the drill Y has performed its office, or, in other words, has entered and enlarged the track of the drill X and formed the bottom of the bore at right angles, or thereabout, to the side thereof, the drill Z is introduced and used to ream out the bottom of the bore or reduce it to a conical shape, such as will centralize the drill X when next introduced and set to work. The diameter of the drill X is made somewhat less than that of the drills Y and Z, whose diameters are equal. The two latter drills must inevitably cut in a straight line and cannot well deviate therefrom. The drill Y, however, is simply employed to enlarge and straighten the drill-hole made by the drill X, while the drill Z prepares the bottom of the enlarged hole for the reception and centralization of the drill X at its next succeeding introduction. The operation of boring a gun or pistol barrel is thus effected or made up by successive operations composed of the three operations of tools in the order above described. In this manner any deviation of the tool X from a straight line is corrected by the tool Y, and consequently the bore of the barrel must be straight, and we still have the advantage of the auger or twisted bit.

What I claim as my invention is—

The above-described mode or process of boring gun-barrels or articles of like character, the same consisting in using the three drills X Y Z in the order and manner as specified.

In testimony whereof I have hereto set my signature this 11th day of July, A. D. 1848.

HENRY PEELER.

Witnesses:
R. H. EDDY,
BENJAMIN EDDY.